(12) United States Patent
Sun et al.

(10) Patent No.: US 9,124,168 B2
(45) Date of Patent: Sep. 1, 2015

(54) METHOD AND APPARATUS FOR ELECTRIC ISOLATION TRANSMISSION

(75) Inventors: Ju-Lu Sun, Nanjing (CN); Jing-Peng Zhu, Nanjing (CN); Ming Xu, Nanjing (CN)

(73) Assignees: FSP-Powerland Technology Inc, Nanjing, Xuanwu Distrial, Nanjing, Chiang-Su Province; FSP TECHNOLOGY INC., Taoyuan, Taoyuan County (TW)

( * ) Notice: Subject to any disclaimer, the term of this patent is extended or adjusted under 35 U.S.C. 154(b) by 430 days.

(21) Appl. No.: 12/982,911

(22) Filed: Dec. 31, 2010

(65) Prior Publication Data

US 2011/0157929 A1    Jun. 30, 2011

(30) Foreign Application Priority Data

Dec. 31, 2009  (CN) .......................... 2009 1 0264204

(51) Int. Cl.
  *H02M 3/335* (2006.01)
  *H02M 5/08* (2006.01)
  *H02M 5/00* (2006.01)

(52) U.S. Cl.
  CPC . *H02M 5/08* (2013.01); *H02M 5/00* (2013.01)

(58) Field of Classification Search
  CPC .......... Y02B 70/1433; Y02B 70/1475; H02M 3/33507; H02M 3/33523; H02M 5/08
  USPC .............................. 363/21.02, 21.03; 378/101
  See application file for complete search history.

(56) References Cited

U.S. PATENT DOCUMENTS

| | | | |
|---|---|---|---|
| 2006/0152199 A1* | 7/2006 | Angquist | 323/208 |
| 2007/0195924 A1* | 8/2007 | Krumme | 378/15 |
| 2007/0211501 A1* | 9/2007 | Zargari et al. | 363/39 |
| 2007/0217574 A1* | 9/2007 | Beyerlein | 378/107 |
| 2011/0038190 A1* | 2/2011 | Zimpfer | 363/126 |

* cited by examiner

*Primary Examiner* — Jue Zhang
(74) *Attorney, Agent, or Firm* — Winston Hsu; Scott Margo

(57) ABSTRACT

A method and apparatus used for electric isolation transmission are provided. The method includes: providing an isolation transmission circuit having at least one capacitor; and implementing electric isolation between the primary side and secondary side, and suppressing leakage currents generated between the primary side and secondary side and transmitting power. The apparatus includes the isolation transmission circuit that is manufactured by capacitor(s). The apparatus can be applied to light-weight power sources providing AC/DC outputs with high efficiency, adapters, or related products. In addition, the apparatus has a reduced size and higher power transmission efficiency.

22 Claims, 14 Drawing Sheets

METHOD AND APPARATUS FOR ELECTRIC ISOLATION TRANSMISSION

BACKGROUND OF THE INVENTION

1. Field of the Invention

The present invention relates to an electric isolation transmission scheme, and more particularly to a method and an apparatus used for electric isolation transmission.

2. Description of the Prior Art

Please refer to FIG. 1, which illustrates a diagram of a conventional power system. The conventional power system utilizes an isolation transformer to implement electric isolation between the primary side and the secondary side. Please refer to FIG. 2, which shows a diagram illustrating a leakage current (i.e. a touch current) due to the isolation transformer in the conventional power system. As shown in FIG. 2, the driving source of the leakage current is a power source having a frequency of 50/60 Hz. In practical applications, parasitic capacitance $C_K$ exits between the primary side and the secondary side of the isolation transformer. This results in a worse performance of the electric isolation between the primary side and the secondary side. Usually, the parasitic capacitance $C_K$ is small enough, so the generated leakage current is also small and is still safe for use.

In order, however, to satisfy the requirement of electric isolation enhancement between the primary side and the secondary side, it is necessary to apply a double insulation scheme to the conventional isolation transformer. Accordingly, it is impossible to make the size of the conventional isolation transformer (i.e. the thickness of the device) become thinner. In addition, due to copper and iron losses, it is hard to improve the power transmission efficiency.

SUMMARY OF THE INVENTION

Therefore, one of the objectives of the present invention is to provide a method and related apparatus capable of implementing electric isolation enhancement between the primary side and secondary side, for suppressing leakage current and improving power transmission.

According to various embodiments of the present invention, steps of the method, circuit elements and operations of the apparatus mentioned above are detailed in the following paragraphs.

The method used for electric isolation transmission comprises: providing an isolation transmission circuit having at least one capacitor; providing electric isolation between a first side and a second side of the isolation transmission circuit; and suppressing a leakage current generated between the first side and the second side, and transmitting power.

The method further comprises: providing a rectifier circuit; providing an inverter circuit; connecting a first side of the isolation transmission circuit to the rectifier circuit and the inverter circuit sequentially in series; connecting the rectifier circuit to an external AC input signal for providing a DC-bus voltage for the back-end inverter circuit; and using the inverter circuit to convert the DC-bus voltage into an AC voltage having a frequency associated with the load.

The method further comprises: providing an inverter circuit and connecting the inverter circuit to the first side of the isolation transmission circuit; and connecting the inverter circuit to an external DC voltage source for converting a DC-bus voltage into an AC voltage having a frequency required by the load.

The method further comprises: providing a common mode suppressing circuit; and connecting the common mode suppressing circuit between the rectifier circuit and the inverter circuit in series or between the inverter circuit and the isolation transmission circuit in series, to suppress a high-frequency portion of a common mode current/leakage current.

The method further comprises: providing a common mode suppressing circuit; and connecting the common mode suppressing circuit to an input of the inverter circuit in series or between the inverter circuit and the isolation transmission circuit, to suppress a high-frequency portion of a common mode current/leakage current.

The method further comprises: connecting a capacitor of the isolation transmission circuit to a resonance inductor in series to increase power transmission efficiency and improve degraded performance generated due to a load being connected to ground.

The method further comprises: when an AC voltage required by the load is different from an output voltage of the isolation transmission circuit, adjusting the output voltage of the isolation transmission circuit by an adjusting circuit to provide the AC voltage required by the load.

In addition, the step of providing the inverter circuit comprises: detecting a voltage/current associated with the load by using a sensor; using an adjusting circuit to process the voltage/current to obtain a signal inputted to a controller; converting a signal outputted from the controller into a frequency adjustment signal via a voltage-to-frequency converter; and using a driving circuit for processing the frequency adjustment signal to obtain a driving signal for controlling the inverter circuit.

The method further comprises: providing a common mode suppressing circuit; and connecting a power factor correction circuit between the rectifier circuit and the common mode suppressing circuit in series for increasing a power factor of the DC-bus voltage.

Additionally, the apparatus comprises the isolation transmission circuit which comprises at least one capacitor.

A first side of the isolation transmission circuit is connected to the rectifier circuit and the inverter circuit sequentially in series.

In another embodiment, the first side of the isolation transmission circuit is connected to the inverter circuit in series.

The apparatus further comprises a common mode suppressing circuit. The common mode suppressing circuit is connected to the rectifier circuit and the inverter circuit in series or connected between the inverter circuit and the isolation transmission circuit.

In another embodiment, the common mode suppressing circuit is connected to an input terminal of the inverter circuit in series or is connected between the inverter circuit and the isolation transmission circuit.

The capacitor is connected to a resonance inductor in series. In addition, the capacitor can be connected to a common mode inductor in series.

The common mode suppressing circuit comprises a first common mode inductor and a second common mode inductor, and the first and second common mode inductors are coupled to each other.

When an AC voltage required by the load is different from an output voltage of the isolation transmission circuit, an output terminal of the isolation transmission circuit is connected to an adjusting circuit in series and is then connected to the load; and, when the load requires a DC voltage, the output terminal of the isolation transmission circuit is sequentially connected to the rectifier circuit and the adjusting circuit in series, and is then connected to the load.

The inverter circuit comprises a closed-loop control system in which a sensor is sequentially connected to the adjusting circuit, a controller, a voltage-to-frequency converter, and a driving circuit in series; where the sensor is configured on the load, and an output terminal of the driving circuit is connected to an input terminal of the inverter circuit.

The rectifier circuit is a full wave or full bridge rectifier having an auto-transformer.

A power factor correction circuit is connected between the rectifier circuit and a common mode suppressing circuit in series.

Moreover, the apparatus can be applied to electric products with light-weight and high efficiency requirements in which an isolation transformer is installed. For example, the electric products can be power adapters or power sources of CCFL backlight modules of LCD flat panel televisions. In addition, the apparatus can be applied to wireless transmission. Since coupling capacitors are utilized, this can effectively increase the transmission efficiency of the power source such as chargers for providing power to mobile devices, e.g. a mobile phone or an MP3/MP4 media player. The apparatus can be applied to non-contact power systems used in fittings and peripheral equipments of computer systems or applied to contact less power systems used in adverse circumstances. In addition, the apparatus has smaller size and higher power transmission efficiency.

These and other objectives of the present invention will no doubt become obvious to those of ordinary skill in the art after reading the following detailed description of the preferred embodiment that is illustrated in the various figures and drawings.

DETAILED DESCRIPTION

The detailed descriptions pertinent to embodiments of the present invention are listed in the following in conjunction with related figures. In addition, safety capacitors are used as examples in the following embodiments but are merely used for illustrative purposes; this is not meant to be a limitation of the present invention.

Figure 3:
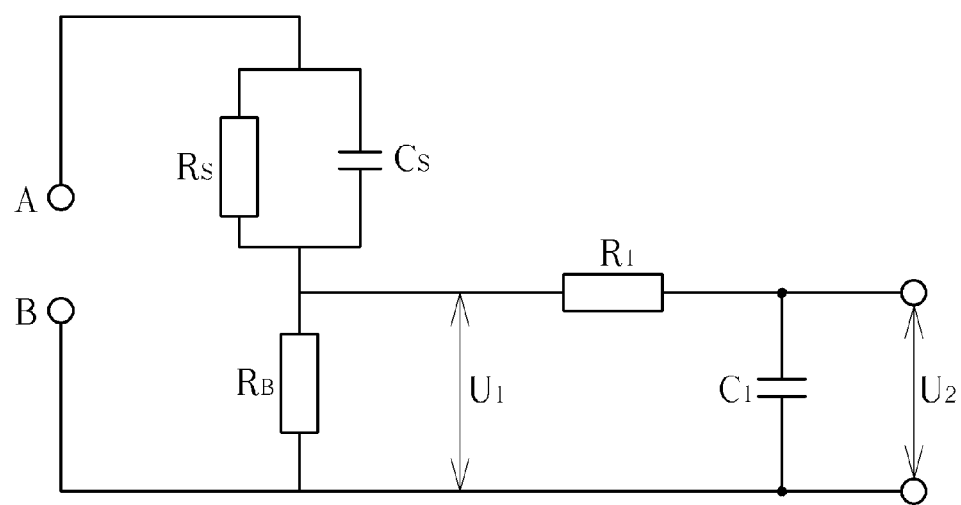
FIG. 3 is a diagram illustrating a testing circuit $Z_{TC}$ for detecting/testing a touch current.
Figure 5:
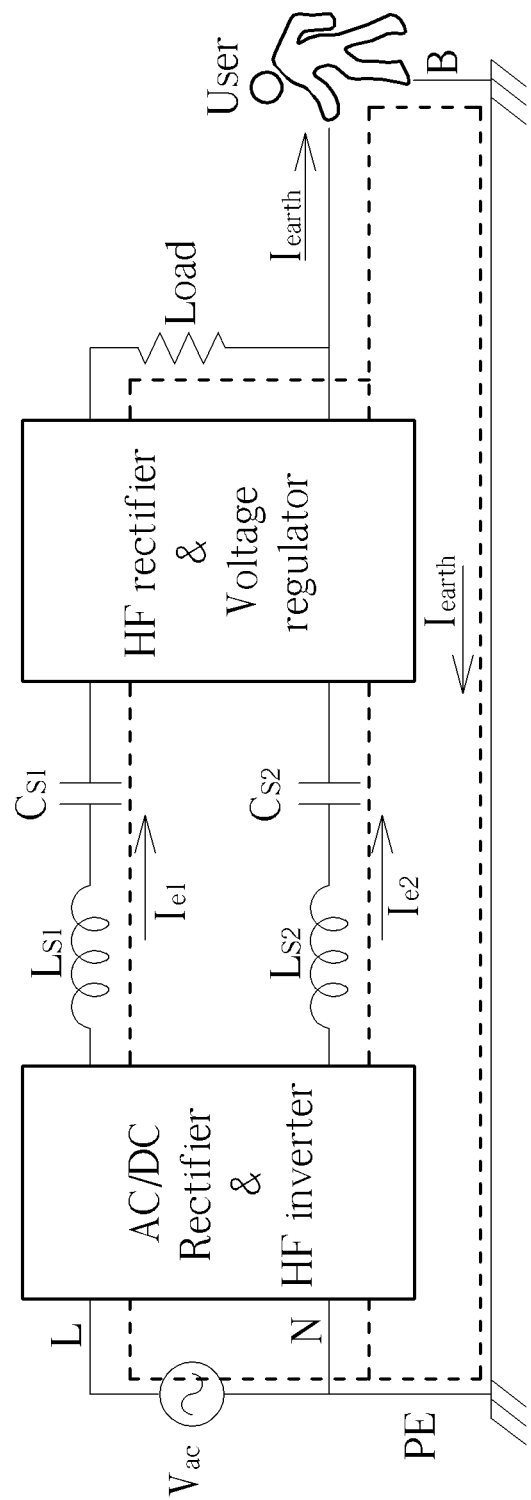
FIG. 5 is a diagram illustrating a leakage current $I_{earth}$ of the isolation transmission circuit shown in FIG. 4.

In the embodiments, by using capacitive elements such as capacitors to isolate, the leakage current $I_{earth}$ ($I_{earth}=I_{e1}+I_{e2}$) in the circuitry loops in which the currents $I_{e1}$ and $I_{e2}$ pass through, the leakage current $I_{earth}$ can be suppressed/decreased to become smaller than the current $I_{TC0}$ to thereby implement isolation between a primary side (i.e. the first side) and secondary side (i.e. the second side) of the transformer as long as the capacitances of the capacitors $C_{S1}$ and $C_{S2}$ are guaranteed to be small enough. In addition, a testing circuit $Z_{TC}$ as shown in FIG. 3 is utilized in practical tests. For example, the design of the resistances and capacitances within the testing circuit $Z_{TC}$ is listed as below:

$R_S=1.5$ k$\Omega$, $R_B=500\Omega$, $R_1=10$ k$\Omega$ $C_1=22$ nF, $C_S=220$ nF It is safe for users when the voltage $V_{TC}$ is equal to the voltage drop $U_2$ which is lower than the voltage $V_{TC0}$ (i.e. $V_{TC}=U_2<V_{TC0}$). For example, the audio/video products conform to the international standard IEC60950 and the signal $V_{TC}$ operates in DC—100 kHz. It is safe for users to use such audio/video products when the voltage $V_{TC0}$ is equal to 0.35Vpk. Accordingly, if it is detected that the voltage $V_{TC}$ is lower than the voltage $V_{TC0}$ (i.e. $V_{TC}<V_{TC0}$) by using the testing circuit $Z_{TC}$ shown in FIG. 3 to replace the user body, then leakage currents can be suppressed or decreased substantially and the isolation between the primary side and secondary side of the transformer can be easily implemented. $V_{ac}$ as shown in FIG. 5 represents a power source providing a line voltage. Considering that the leakage current $I_{earth}$ is maximum when the ground wire PE is directly connected to the neutral wire N, in the following description, the analysis for the leakage current $I_{earth}$ is based on the direct connection between the ground wire PE and the NEUTRAL WIRE N. However, this is not intended to be a limitation of the present invention. The block named "AC/DC rectifier & HF inverter" is comprised of a rectifier circuit and an inverter circuit wherein the rectifier circuit is a full bridge rectifier or a power factor correction (PFC) rectifier and the inverter circuit is a full bridge inverter or a half bridge inverter. When the output of the block "AC/DC rectifier & HF inverter" is an AC output signal, the frequency of the inverter circuit is dependent on the load.

Figure 4:
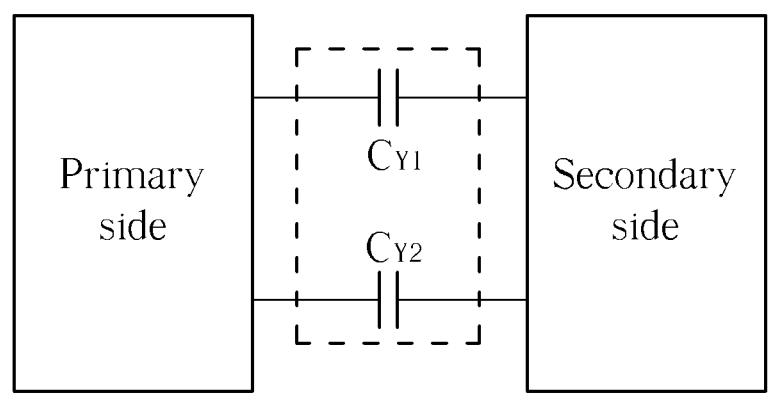
FIG. 4 is a block diagram showing an embodiment of the isolation transmission circuit between the primary side and the secondary side of a transformer according to the present invention.

Please refer to FIG. 4, which illustrates a block diagram showing an embodiment of the isolation between the primary side and the secondary side of a transformer. By adopting Y1 type capacitors and corresponding frequency resonance, the common mode suppressing circuit can effectively achieve electrical isolation, power transmission, and the suppression of leakage currents between the primary side and the secondary side. Thus, the present invention can be applied to slim and high efficiency power supply providing AC or DC outputs, or related products.

Please refer to FIG. 5. The elements $C_{S1}$, $L_{S1}$, $C_{S2}$, and $L_{S2}$ constitute a series-resonance circuit. The elements $C_{S1}$ and $C_{S2}$ are Y1 type capacitors having capacitance represented by nanometer Farah (nF). The Y1 type capacitors can be used to enhance the isolation between the primary side and the secondary side. In addition, since the frequency of the inverter circuit is usually lower in most applications, connecting the resonance inductor(s) with the safety capacitor branch in series can implement series-resonance and thereby decrease the impedance of the transmission loop to raise the power transmission efficiency. In addition, connecting the resonance inductor(s) with the safety capacitor branch in series can substantially decrease the impedance of the resonance branch connected between the load and the ground level so that such impedance becomes sufficiently small. This can also reduce the affects caused by the load directly connecting to ground.

The block named "HF rectifier & voltage regulator" is used for adjusting the voltage of the output signal. If the output signal is a DC voltage signal, the block "HF rectifier & voltage regulator" is comprised of a high frequency rectifier and a DC/DC circuit. If the output signal is an AC voltage signal and needs to be adjusted, the block "HF rectifier & voltage regulator" is comprised of a non-isolated voltage regulation circuit such as an auto-transformer or a resonance circuit. However, these examples mentioned above are merely used for illustrative purposes, and not meant to be limitations of the present invention.

In addition, the approaches in various embodiments of the present invention are implemented according to the capacitive isolation method and related circuitry provided by the embodiments of the present invention. It should be noted that embodiment implementations and detailed calculations are described in the following paragraphs, and the embodiment implementations described below should not be taken as limitations of the present invention.

Figure 6:
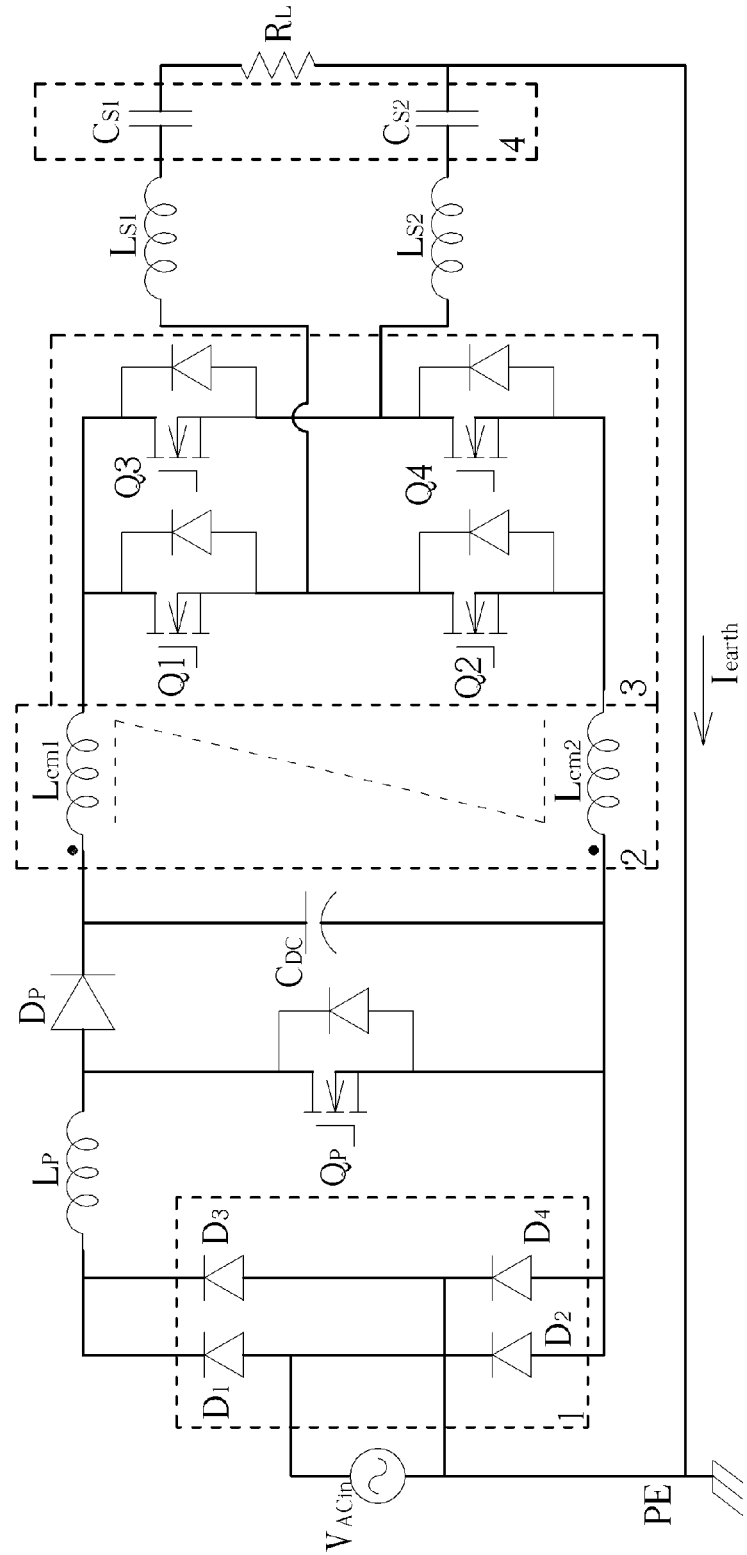
FIG. 6 shows a diagram of an embodiment of the circuit shown in FIG. 5 with AC input and output and the secondary side connected to ground.

Application of AC Output Signal:

a) Secondary Side is Connected to Ground when Normally Used:

The Class I product having a secondary side connected to the ground wire PE and L-N-PE three-wire inputs is suitable for use in this situation. The detailed circuit diagram can be seen in FIG. 6. As shown in FIG. 6, the voltage $V_{ACin}$ is a line frequency AC input such as a line voltage. In this embodiment, the worst case in which the ground wire PE is directly connected to the neutral wire N is considered. The front-end power factor correction (PFC) circuit is comprised of the bridge rectifiers D1-D4 and the elements $L_P$, $D_P$, $Q_P$, and $C_{DC}$. The front-end PFC circuit is used to provide a DC-bus voltage signal for the back-end inverter circuit. The high frequency inverter circuit described herein is implemented by the full bridge inverter which is comprised of the elements $Q_1$-$Q_4$. The inverter frequency is designed to be the frequency required by the load. For example, the inverter frequency can be designed to be equal to or higher than several 10 kHz at least. However, this is not meant to be a limitation of the present invention.

$R_L$ is indicative of the load equivalent resistor. $C_{S1}$ and $C_{S2}$ represent capacitances of type Y1 safety capacitors with several nanometers Farah (nF). The type Y1 safety capacitors can effectively suppress leakage currents caused by a line voltage and can also guarantee enhancement of the isolation between the primary side and secondary side. The inductors $L_{S1}$, $L_{S2}$ and the capacitors $C_{S1}$, $C_{S2}$ form a series-resonance circuit, and the resonance frequency of the series-resonance circuit is slightly lower than the inverter frequency of the high frequency inverter bridge. The impedance of high frequency energy required by the load under the differential mode is extremely small, and the series-resonance circuit can guarantee the enable of zero-voltage switching (ZVS) of the elements $Q_1$-$Q_4$. In addition, currents passing through the inverter bridge are not affected by the series-resonance circuit. Therefore, the system efficiency can be improved.

Figure 1:
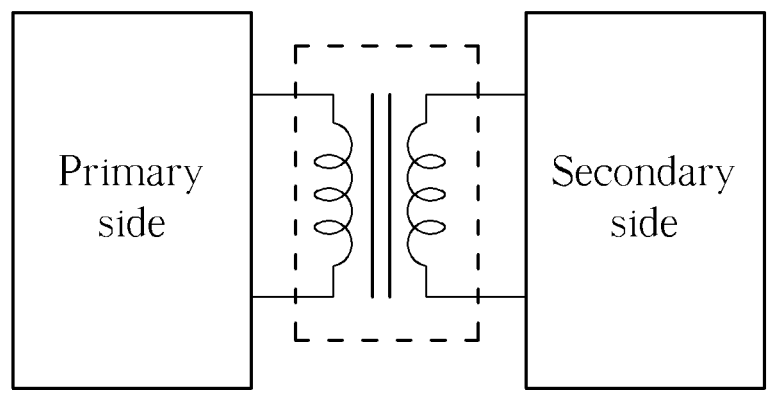
FIG. 1 is a diagram of a conventional power system in which an isolation transformer is configured for implementing isolation between the primary side and the secondary side.
Figure 2:
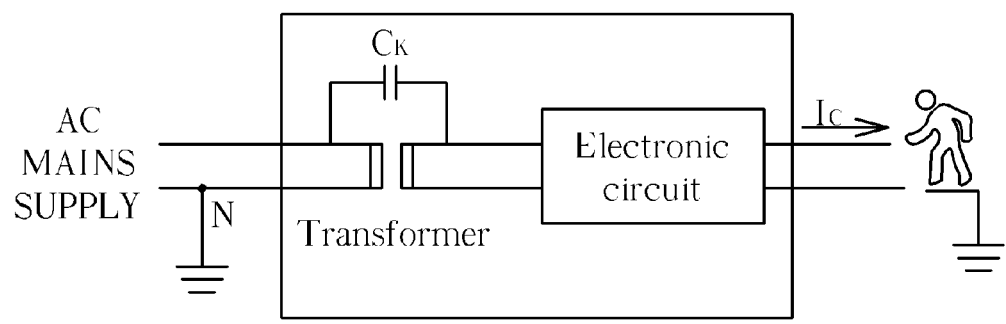
FIG. 2 is a diagram illustrating a leakage current generated due to the isolation transformer in the conventional power system shown in FIG. 1.
Figure 7:
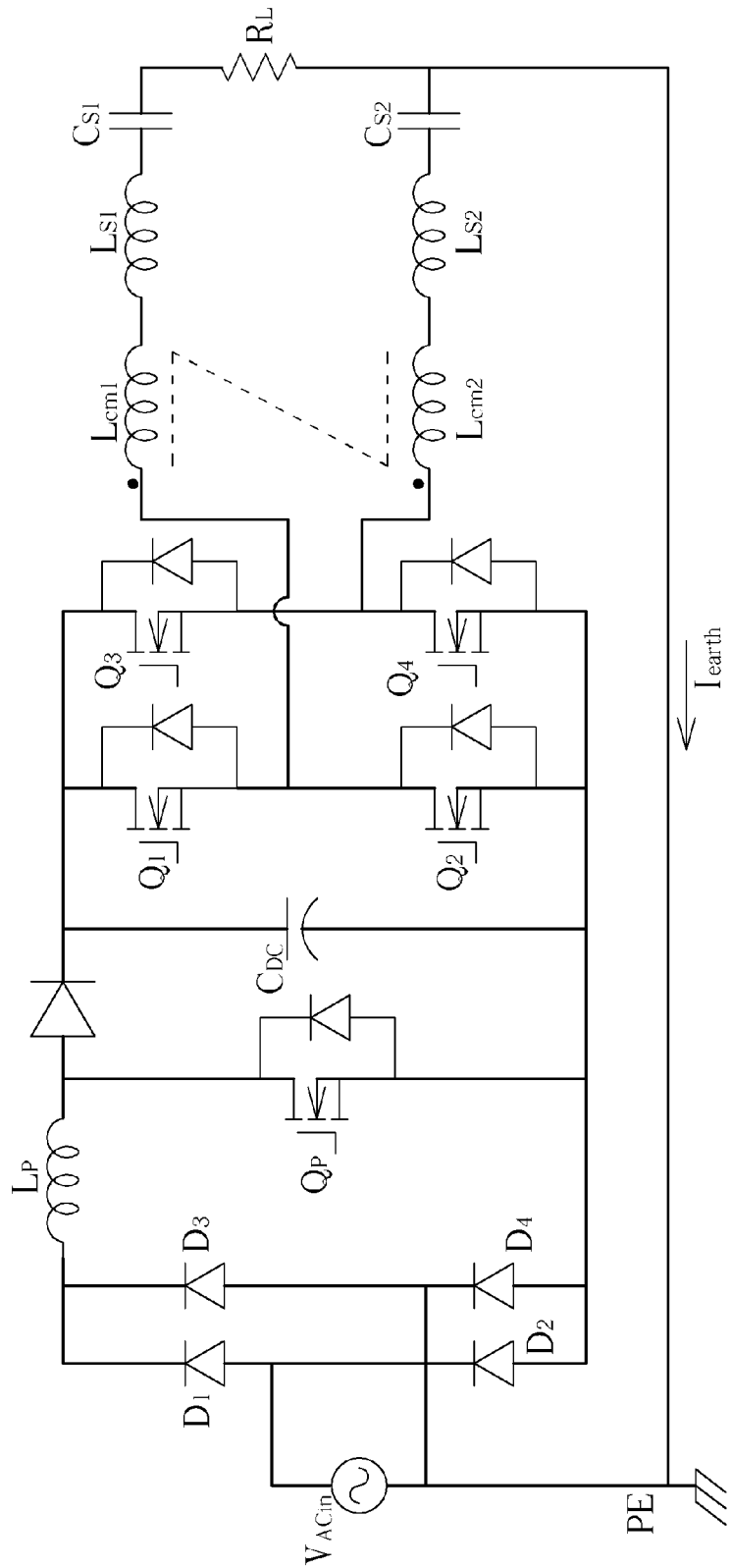
FIG. 7 shows a circuit diagram illustrating common mode inductors placed within a series-resonance loop.

$L_{cm1}$ and $L_{cm2}$ are coupling common mode inductors used for suppressing high frequency portions of the common mode currents (i.e. leakage currents) passing though the ground wire PE and for guaranteeing normal operation of the circuitry system. As shown in FIG. 6, inductors $L_{cm1}$ and $L_{cm2}$ are connected between the PFC circuit and the inverter circuit in series. In another modification, as shown in FIG. 7, the inductors $L_{cm1}$ and $L_{cm2}$ can be connected between branches of the circuit network formed by $C_{S1}$-$L_{S1}$ and $C_{S2}$-$L_{S2}$ in series. In addition, the common mode inductors $L_{cm1}$ and $L_{cm2}$ can be manufactured by low-loss magnetic cores with low magnetic permeability. The number of winding turns (i.e. inductance) of the magnetic core can be raised up if possible. The approaches can decrease core loss of the common mode inductors and improve the system efficiency.

b) Secondary Side is not Connected to Ground when Normally Used:

The Class II product having L-N two-wire inputs or the Class I product having a secondary side not connected to the ground wire PE is suitable for use in this situation. Detailed circuit diagram can be seen in FIG. 8. A difference compared to the case a) is described in the following. In this embodiment, for a circuitry system having a secondary side not connected to the ground when normally used, the touch current test circuit network shown in FIG. 2 is connected between nodes A and B shown in FIG. 8 during the test of the touch current while the node A is disconnected from the node B during normal operation. Due to this, in this embodiment, the inverter bridge is designed as a half bridge structure comprised of the elements $Q_1$ and $Q_2$. The inverter frequency is the frequency required by the load. It is not required to use common mode inductors. The front-end stage circuit is a PFC circuit comprised of the elements $D_1$-$D_4$, $L_P$, $Q_P$, $D_P$, and $C_{DC}$. The signal $V_{ACin}$ is the industry frequency power source providing a line voltage. The worst case in which the ground wire PE is directly connected to the neutral wire N is still considered. $R_L$ represents an effective load. The capacitors $C_{S1}$ and $C_{S2}$ are implemented by using Y1 type capacitors. The elements $C_{S1}$, $C_{S2}/L_{S1}/L_{S2}$, and the load form a series-resonance circuit network. The resonance frequency of the series-resonance circuit network is designed to be slightly lower than the inverter frequency, to implement the transmission of high frequency energy, achieve enablement of ZVS of the elements $Q_1$, $Q_2$, and to improve the system efficiency.

Figure 8:
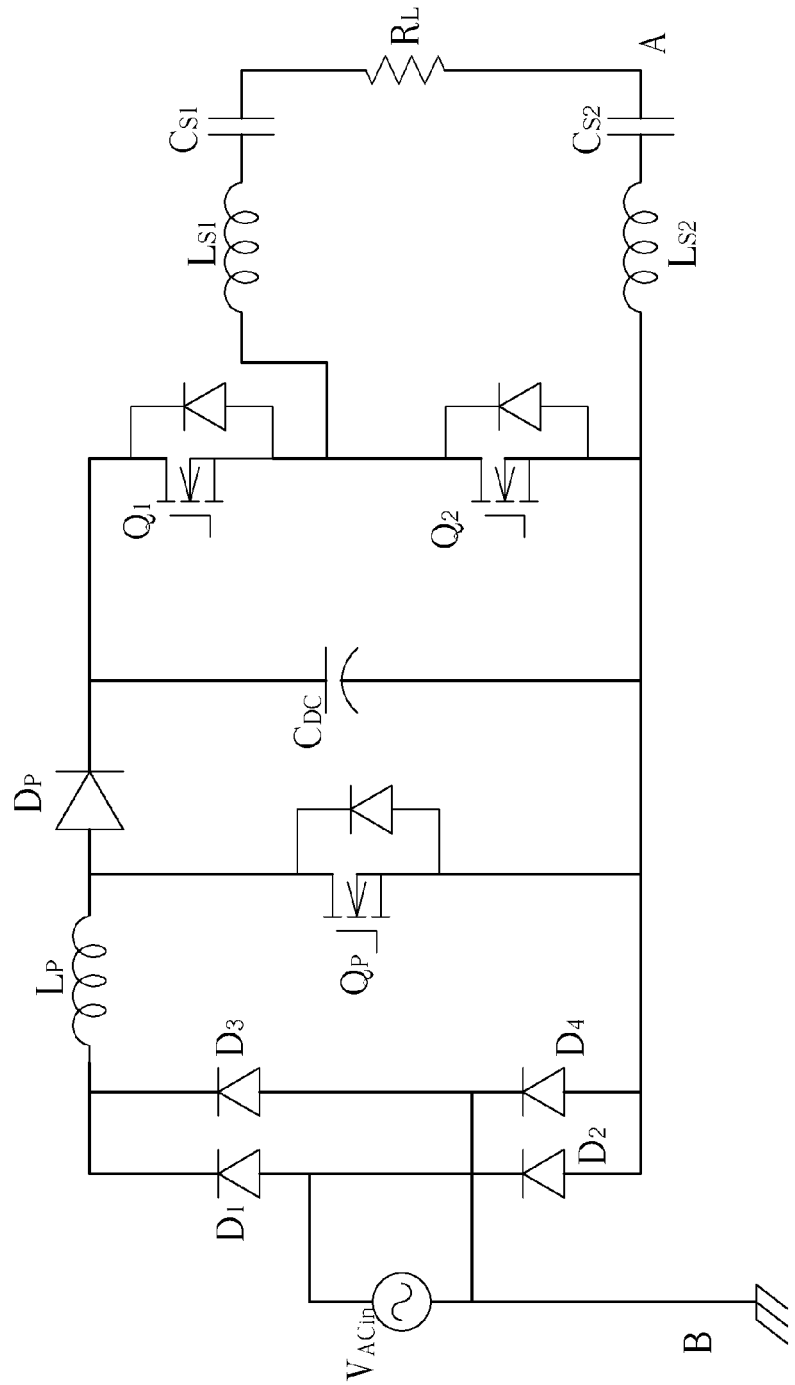
FIG. 8 shows a diagram of an embodiment of the present invention with the secondary side not connected to ground.

The reason why the common mode inductors are not necessary to be implemented in this embodiment is that high frequency leakage currents generated in the circuit shown in FIG. 8 are far smaller than that generated in the circuit shown in FIG. 6 when the touch current is tested. By reasonably designing the values of the elements $C_{S1}$, $C_{S2}$, $L_{S1}$, and $L_{S2}$, the elements $C_{S2}$ and $L_{S2}$ can form a series-resonance circuit. The impedance of a resonance branch connected to the load's terminal that is connected to the ground can be decreased to be as small as possible to thereby decrease leakage currents during testing. Decreasing the impedance can make the circuit shown in FIG. 8 test the touch current without using common mode inductors to suppress high frequency portions of the touch current. This can also satisfy a requirement that the voltage $V_{TC}$ is lower than the voltage $V_{TC0}$ and thereby implement the isolation between the primary side and secondary side.

Figure 9:
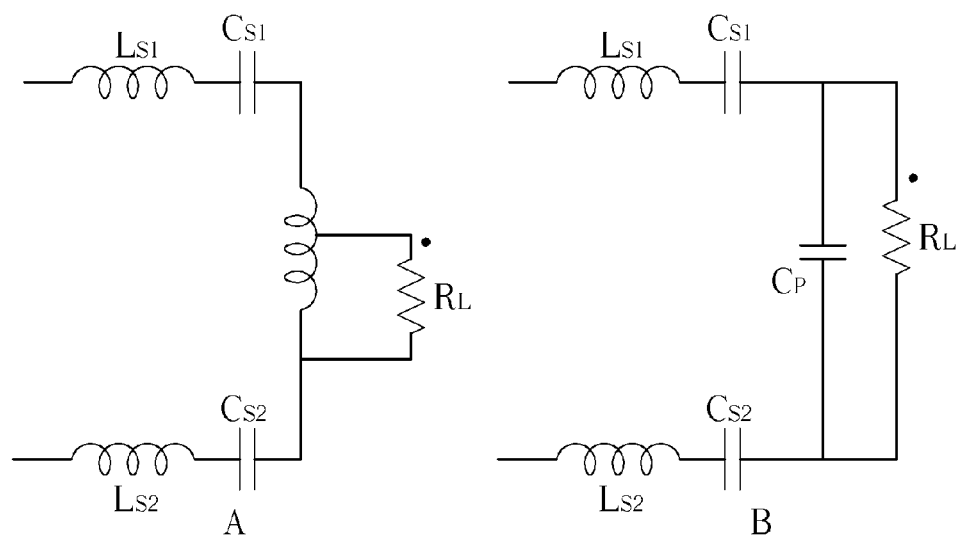
FIG. 9A shows a diagram of an auto-transformer configured within the adjusting circuit for adjusting voltages.
FIG. 9B shows a diagram of an LCC resonance circuit configured within the adjusting circuit for adjusting voltages.

The circuit shown in FIG. 8 of this embodiment can also be modified to be used as a product having a secondary side connected to ground when normally used. In this situation, it is necessary to configure a set of common mode inductors within the circuit shown in FIG. 8, to suppress the protective conductor current (PCC). Such type of protective conductor current may be generated by node A of the circuit shown in FIG. 8 being directly connected to node B and no testing circuit $Z_{TC}$ connected between nodes A and B when the circuit is normally used. The generated protective conductor current may decrease the system efficiency and affect the EMC performance. Utilizing the half bridge circuit in this embodiment may cause the output voltage of the half bridge circuit to be lower than that of the full bridge inverter circuit. To solve this problem, an approach to adjust the output voltage is as described in the following.

c) Adjustment of Output Voltage/Current:

The implementation of the isolation between the primary side and secondary side is realized by using the type Y1 capacitors $C_{S1}$ and $C_{S2}$, so the adjustment of the output voltage/current can be achieved by using an auto-transformer as shown in FIG. 9A or a resonance circuit as shown in FIG. 9B. When the resonance circuit shown in FIG. 9B is utilized to adjust the output voltage/current, the output voltage/current can be adjusted in a closed-loop manner (shown in FIG. 10) by controlling the inverter frequency, so as to satisfy a precision requirement of the load.

Figure 10:
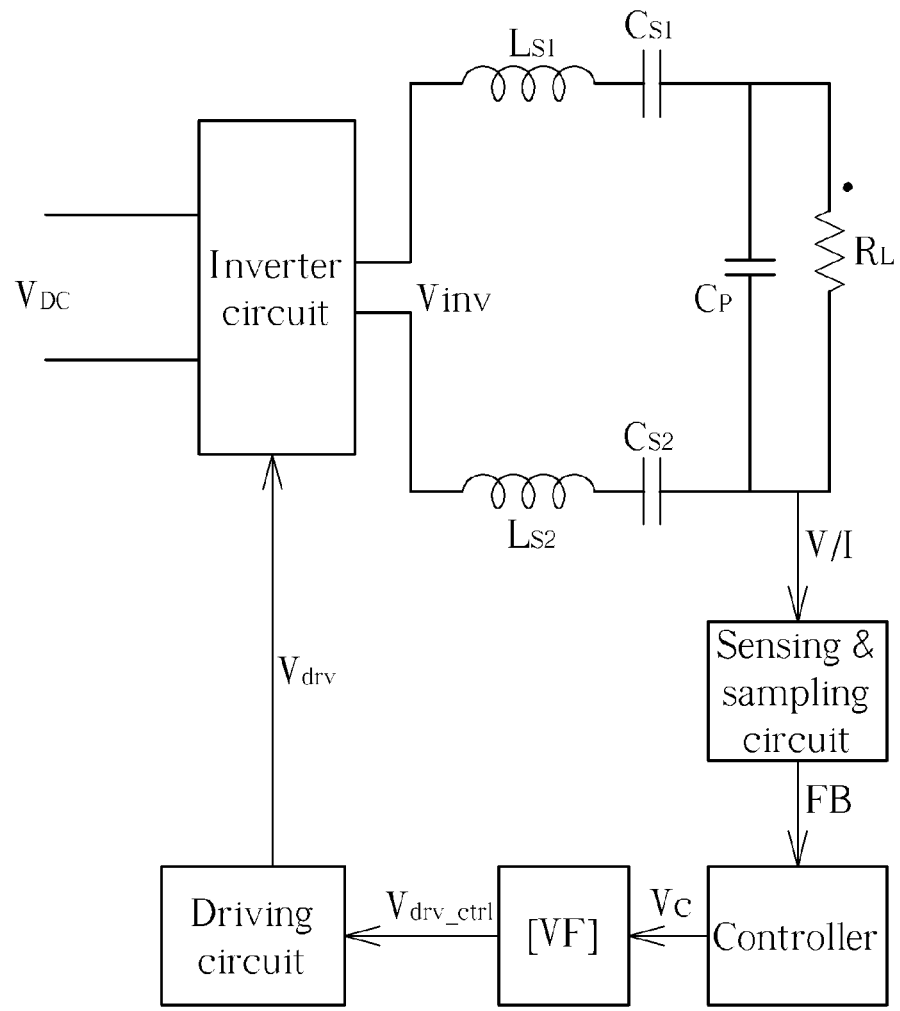
FIG. 10 is a diagram of an LCC closed-loop voltage adjusting system according to an embodiment of the method of the present invention.

As shown in FIG. 10, the output voltage/current signal V/I is processed by the sensing & sampling circuit block to generate a signal fed back to the controller wherein such signal is used as the input signal FB. If the output voltage/current signal V/I is represented as a digital signal, then an analog-to-digital (AD) converter is required for AD conversion. The controller can be implemented by an analog circuit such as a PID compensation circuit or by a digital circuit such as a microcontroller (MCU). The controller can also be implemented by a DSP circuit or FPGA circuit performing digital PID calculations. Additionally, for the control of frequency adjustment, the output voltage $V_C$ of the controller is converted to a frequency adjusting signal via the voltage-to-frequency converter VF. The voltage-to-frequency converter VF can be implemented by a VCO circuit or by a digital circuit that performs frequency adjustment. The frequency adjustment signal outputted by the voltage-to-frequency converter VF is used as an input signal of a driving circuit. Through the operation of the driving circuit, the inverter frequency of the inverter circuit can be controlled appropriately to thereby adjust the frequency of the output voltage of the inverter circuit. The voltage gain of the resonance circuit such as an LCC resonance circuit shown in FIG. 10 becomes different when the resonance frequency becomes different. Thus, by adjusting the inverter frequency, adjustment of the output voltage can be achieved. This results in a closed-loop adjustment for the output voltage. The resonance capacitor in this embodiment can also enhance the isolation between the primary side and secondary side, that a prior art resonance voltage adjusting circuit cannot provide.

Figure 11:
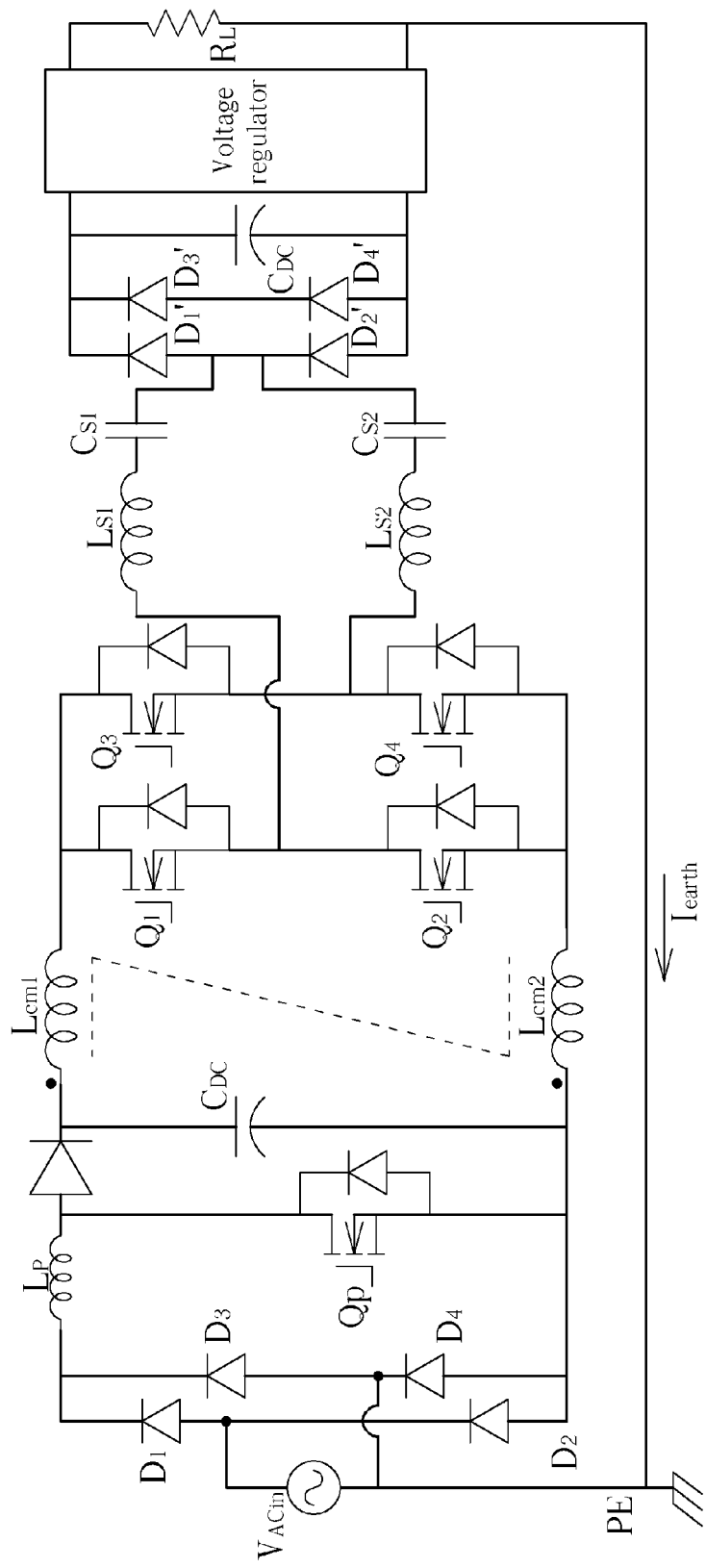
FIG. 11 shows a diagram illustrating another embodiment of a full bridge inverter and a full bridge rectifier according to the present invention.

B) Application of DC Output Signal:

FIG. 11 shows a diagram illustrating another embodiment OF a full bridge inverter and a full bridge rectifier according to the present invention. The circuit shown in FIG. 11 is based on the circuit shown in FIG. 6, a rectifier circuit portion, and a voltage adjusting circuit portion. The elements $D_1'$-$D_4'$ are used as a high-frequency bridge rectifier, and the element $C_{DC2}$ is used as a filtering capacitor for the rectifier output. The voltage regulator is used as a voltage adjusting circuit such as a buck circuit, and is utilized for outputting a DC voltage signal that matches the precision requirement of the load $R_L$.

Figure 12:
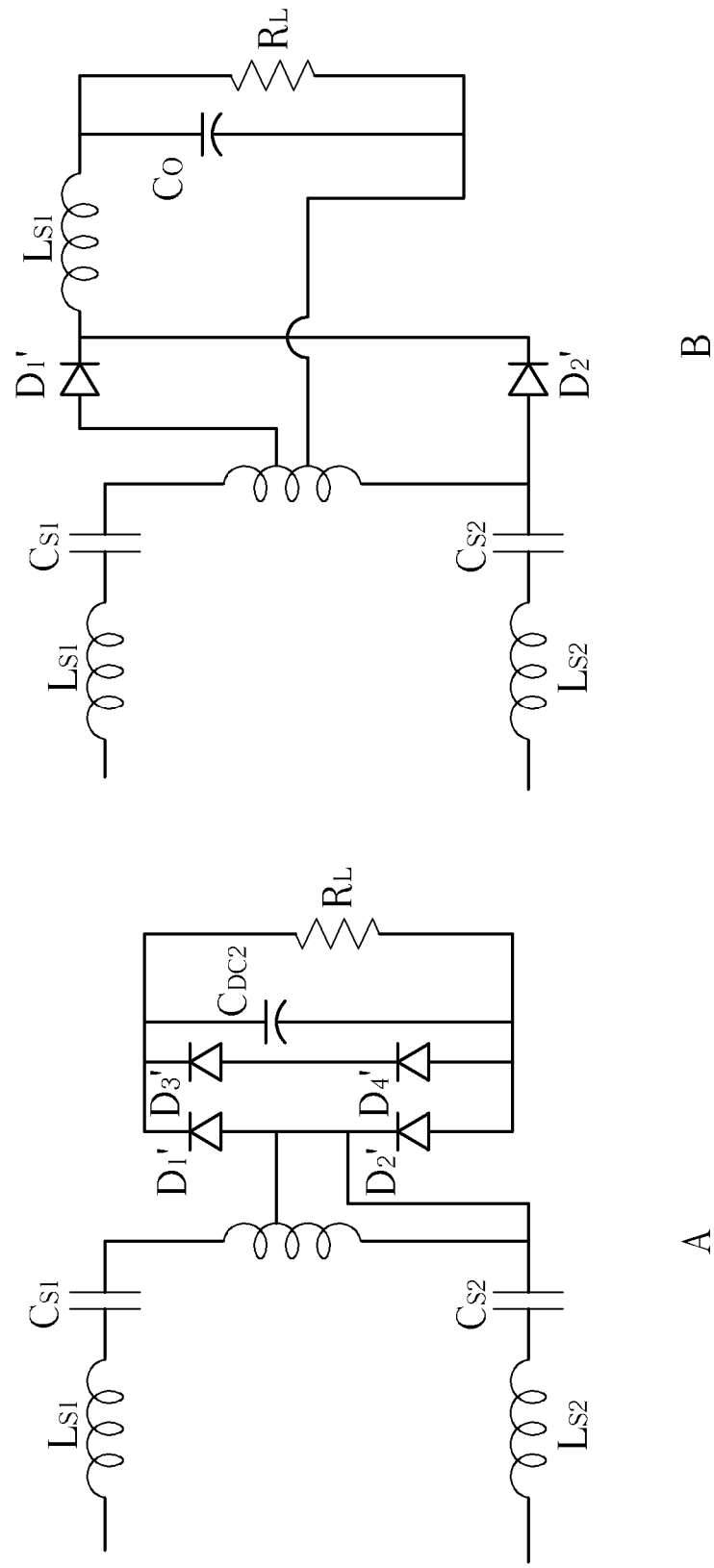
FIG. 12A shows a diagram of a full bridge rectifier circuit with DC output that is implemented by an auto-transformer according to an embodiment of the present invention.
FIG. 12B shows a diagram of a full wave rectifier circuit with DC output that is implemented by an auto-transformer according to another embodiment of the present invention.

In addition to using the full bridge rectifier, the rectifier circuit can use an auto-transformer to implement the full bridge rectifier circuit shown in FIG. 12A, or can implement the full wave rectifier circuit shown in FIG. 12B. A difference between embodiments using the AC output signal and the DC output signal is that the inverter frequency can be raised up as far as possible in the case of the DC output signal while the inverter frequency depends on the load $R_L$ in the case of the AC output signal. Since the inverter frequency can be raised up, the circuit size of the whole circuitry system can be decreased further.

Figure 13:
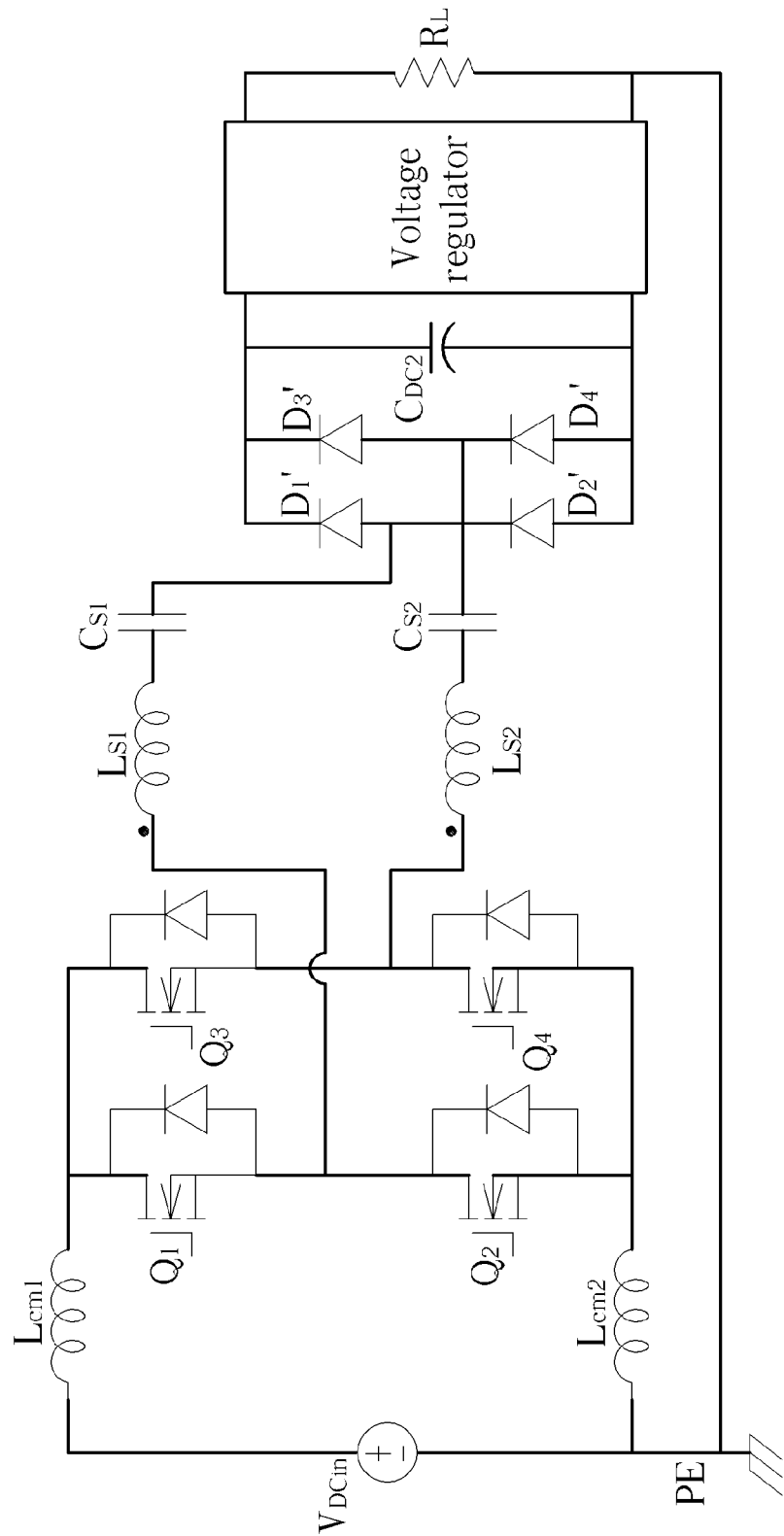
FIG. 13 is a diagram of the circuit shown in FIG. 4 with DC input and DC output according to an embodiment of the present invention.
Figure 14:
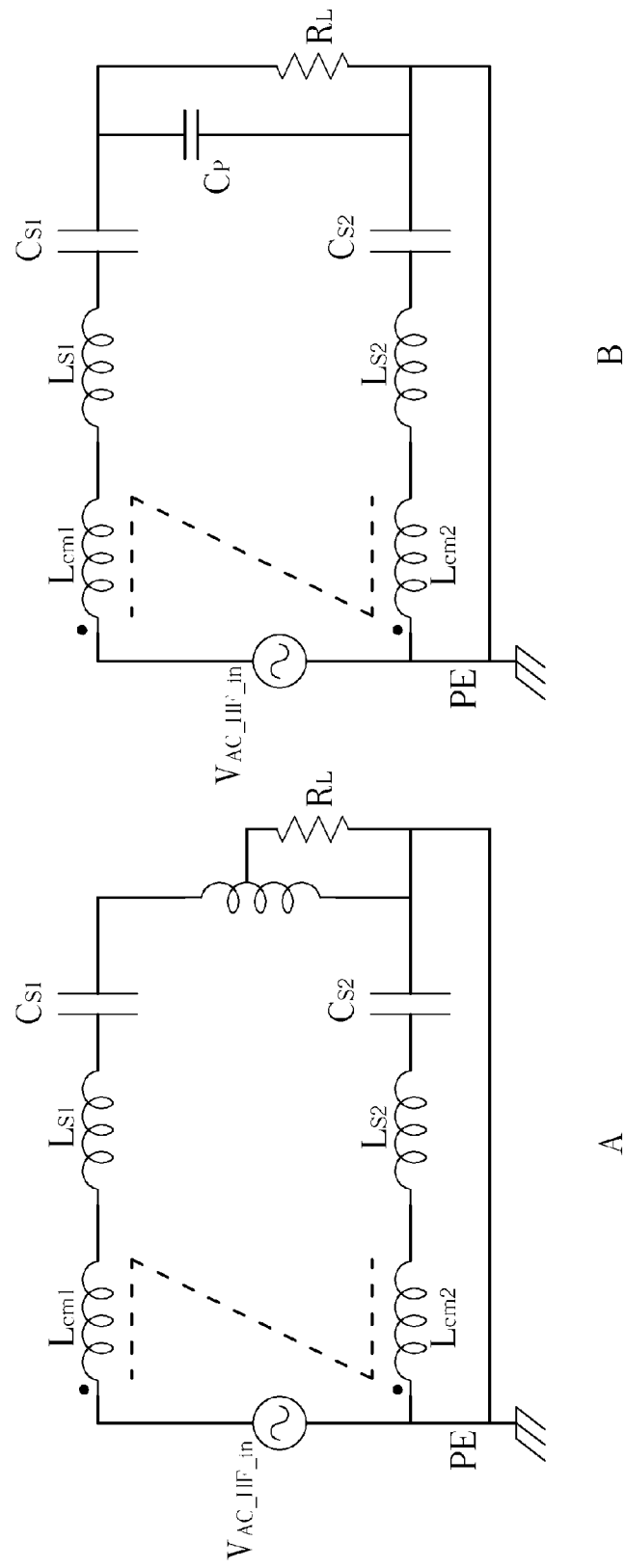
FIGS. 14A-14B are diagrams of implementations of the circuit shown in FIG. 4 with high-frequency AC input and AC output according to embodiments of the present invention.

C) Application of DC Input and High-frequency AC Input:

Based on the cases of applications of the AC input, AC output, and DC output, the input signal can be a DC voltage input signal or a high-frequency AC voltage input signal. The circuits corresponding to the DC voltage input signal and the high-frequency AC voltage input signal are respectively illustrated in FIG. 13 and FIG. 14. The DC voltage input signal and the high-frequency AC input voltage signal are directly connected to the ground wire PE or are not isolated from the ground wire PE. Safety capacitors are utilized for isolating the output signal from the input signal, to achieve better insulation and limit leakage currents adequately.

Those skilled in the art will readily observe that numerous modifications and alterations of the device and method may be made while retaining the teachings of the invention.

What is claimed is:

1. A method used for electric isolation transmission, comprising:
providing an isolation transmission circuit having a first side, a second side, a first capacitor, a second capacitor, a first resonance inductor and a second resonance inductor, wherein the first side has a first end and a second end, the second side has a third end and a fourth end, the isolation transmission circuit does not have an isolation transformer, and the first capacitor and the second capacitor are Y capacitors;
providing a high frequency inverter bridge coupling to the first side of the isolation transmission circuit in series, wherein a resonant frequency of the isolation transmission circuit is lower than an inverter frequency of the high frequency inverter bridge;
coupling the first resonance inductor to a first end of the first side;
coupling the first capacitor between the first resonance inductor and the third end of the second side;
coupling the second resonance inductor to the second end of the first side;
coupling the second capacitor between the second resonance inductor and the fourth end of the second side;
using the first resonance inductor, the first capacitor, the second resonance inductor and the second to provide electric isolation between the first side and the second side of the isolation transmission circuit; and
using the first resonance inductor, the first capacitor, the second resonance inductor and the second to suppress a leakage current generated between the first side and the second side, and to transmit power.

2. A method according to claim 1, comprising:
providing a rectifier circuit;

connecting the first side of the isolation transmission circuit to the rectifier circuit and the high frequency inverter bridge sequentially in series;

connecting the rectifier circuit to an external AC input signal for providing a DC-bus voltage for the back-end high frequency inverter bridge; and using the high frequency inverter bridge to convert the DC-bus voltage into an AC voltage having a frequency associated with a load.

3. A method according to claim 1, comprising:

connecting the high frequency inverter bridge to an external DC voltage source, for converting a DC-bus voltage into an AC voltage having a frequency required by a load.

4. A method according to claim 2, comprising:

providing a common mode suppressing circuit; and connecting the common mode suppressing circuit between the rectifier circuit and the high frequency inverter bridge in series or between the high frequency inverter bridge and the isolation transmission circuit in series, to suppress a high-frequency portion of a common mode current/leakage current.

5. A method according to claim 3, comprising:

providing a common mode suppressing circuit; and connecting the common mode suppressing circuit to an input of the high frequency inverter bridge in series or between the high frequency inverter bridge and the isolation transmission circuit, to suppress a high-frequency portion of a common mode current/leakage current.

6. A method according to claim 1, wherein the series connection of the first capacitor and the first resonance inductor of the isolation transmission circuit is arranged to increase power transmission efficiency and improve degraded performance generated due to a load being connected to ground.

7. A method according to claim 1, comprising:

when an AC voltage required by a load is different from an output voltage of the isolation transmission circuit, adjusting the output voltage of the isolation transmission circuit by an adjusting circuit to provide the AC voltage required by the load.

8. A method according to claim 2, wherein the step of providing the high frequency inverter bridge comprises:

detecting a voltage/current associated with the load by using a sensor;

using an adjusting circuit to process the voltage/current to obtain a signal inputted to a controller;

converting a signal outputted from the controller into a frequency adjustment signal via a voltage-to-frequency converter; and using a driving circuit for processing the frequency adjustment signal to obtain a driving signal for controlling the high frequency inverter bridge.

9. A method according to claim 3, wherein the step of providing the high frequency inverter bridge comprises:

detecting a voltage/current associated with the load by using a sensor;

using an adjusting circuit to process the voltage/current to obtain a signal inputted to a controller;

converting a signal outputted from the controller into a frequency adjustment signal via a voltage-to-frequency converter; and using a driving circuit for processing the frequency adjustment signal to obtain a driving signal for controlling the high frequency inverter bridge.

10. A method according to claim 3, comprising:

providing a common mode suppressing circuit; and connecting a power factor correction circuit between a rectifier circuit and the common mode suppressing circuit in series, to increase a power factor of the DC-bus voltage.

11. An apparatus for electric isolation transmission, comprising:

an isolation transmission circuit, comprising:

a first side having a first end and a second end;

a second side having a third end and a fourth end;

a first resonance inductor coupled to the first end of the first side;

a first capacitor coupled between the first resonance inductor and the third end of the second side;

a second resonance inductor coupled to the second end of the first side; and a second capacitor coupled between the second resonance inductor and the fourth end of the second side, wherein the first resonance inductor, the first capacitor, the second resonance inductor and the second capacitor are arranged for providing electric isolation between the first side and the second side, suppressing a leakage current generated between the first side and the second side, and transmitting power; and a high frequency inverter bridge coupled to the first side of the isolation transmission circuit in series, wherein a resonant frequency of the isolation transmission circuit is lower than an inverter frequency of the high frequency inverter bridge;

wherein the isolation transmission circuit does not have an isolation transformer; and the first capacitor and the second capacitor are Y capacitors.

12. An apparatus for electric isolation transmission according to claim 11, further comprising:

a rectifier circuit;

wherein the first side of the isolation transmission circuit is connected to the rectifier circuit and the high frequency inverter bridge sequentially in series.

13. An apparatus for electric isolation transmission according to claim 12, further comprising:

a common mode suppressing circuit, connected to the rectifier circuit and the high frequency inverter bridge in series or connected between the high frequency inverter bridge and the isolation transmission circuit.

14. An apparatus for electric isolation transmission according to claim 11, further comprising:

a common mode suppressing circuit, connected to an input terminal of the high frequency inverter bridge in series or connected between the high frequency inverter bridge and the isolation transmission circuit.

15. An apparatus for electric isolation transmission according to claim 11, wherein the first resonance inductor is connected between a first common mode inductor and the first capacitor.

16. An apparatus for electric isolation transmission according to claim 13, wherein the common mode suppressing circuit comprises a first common mode inductor and a second common mode inductor, and the first and second common mode inductors are coupled to each other.

17. An apparatus for electric isolation transmission according to claim 14, wherein the common mode suppressing circuit comprises a first common mode inductor and a second common mode inductor, and the first and second common mode inductors are coupled to each other.

18. An apparatus for electric isolation transmission according to claim 11, wherein when an AC voltage required by a load is different from an output voltage of the isolation transmission circuit, an output terminal of the isolation transmission circuit is connected to an adjusting circuit in series and is then connected to the load; and, when the load requires a DC voltage, the output terminal of the isolation transmission circuit is sequentially connected to the rectifier circuit and the adjusting circuit in series, and is then connected to the load.

19. An apparatus for electric isolation transmission according to claim 11,
wherein the high frequency inverter bridge comprises a closed-loop control system in which a sensor is sequentially connected to an adjusting circuit, a controller, a voltage-to-frequency converter, and a driving circuit in series; and the sensor is configured on a load, and an output terminal of the driving circuit is connected to an input terminal of the high frequency inverter bridge.

20. An apparatus for electric isolation transmission according to claim 11, further comprising:
a rectifier circuit, wherein the rectifier circuit is a full wave or full bridge rectifier having an auto-transformer.

21. An apparatus for electric isolation transmission according to claim 12, further comprising:
a common mode suppressing circuit; and
a power factor correction circuit, wherein the power factor correction circuit is connected between the rectifier circuit and the common mode suppressing circuit in series.

22. An apparatus for electric isolation transmission according to claim 11, further comprising:
a common mode suppressing circuit; and
a power factor correction circuit, wherein the power factor correction circuit is connected between the rectifier circuit and the common mode suppressing circuit in series.

* * * * *